Figure 6:
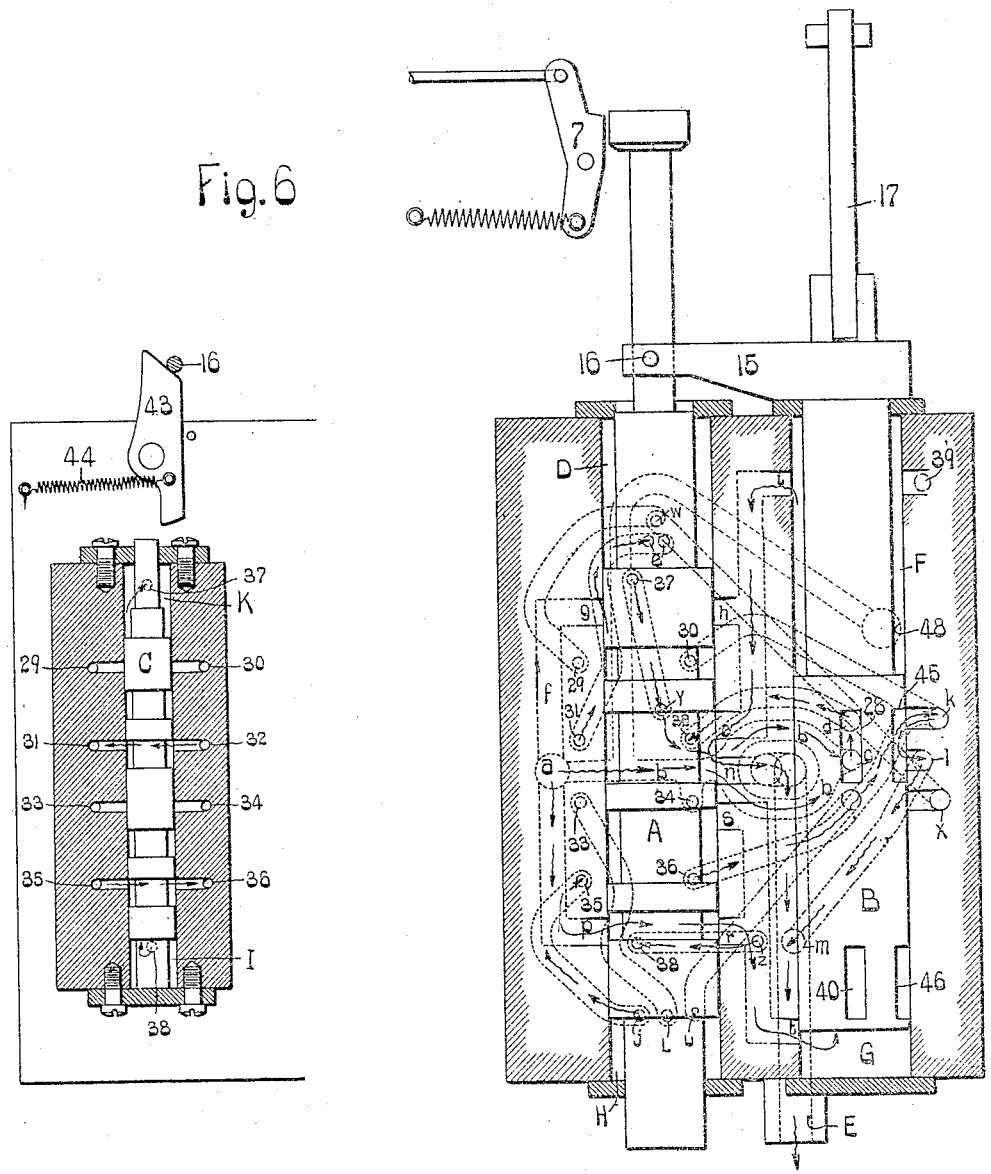

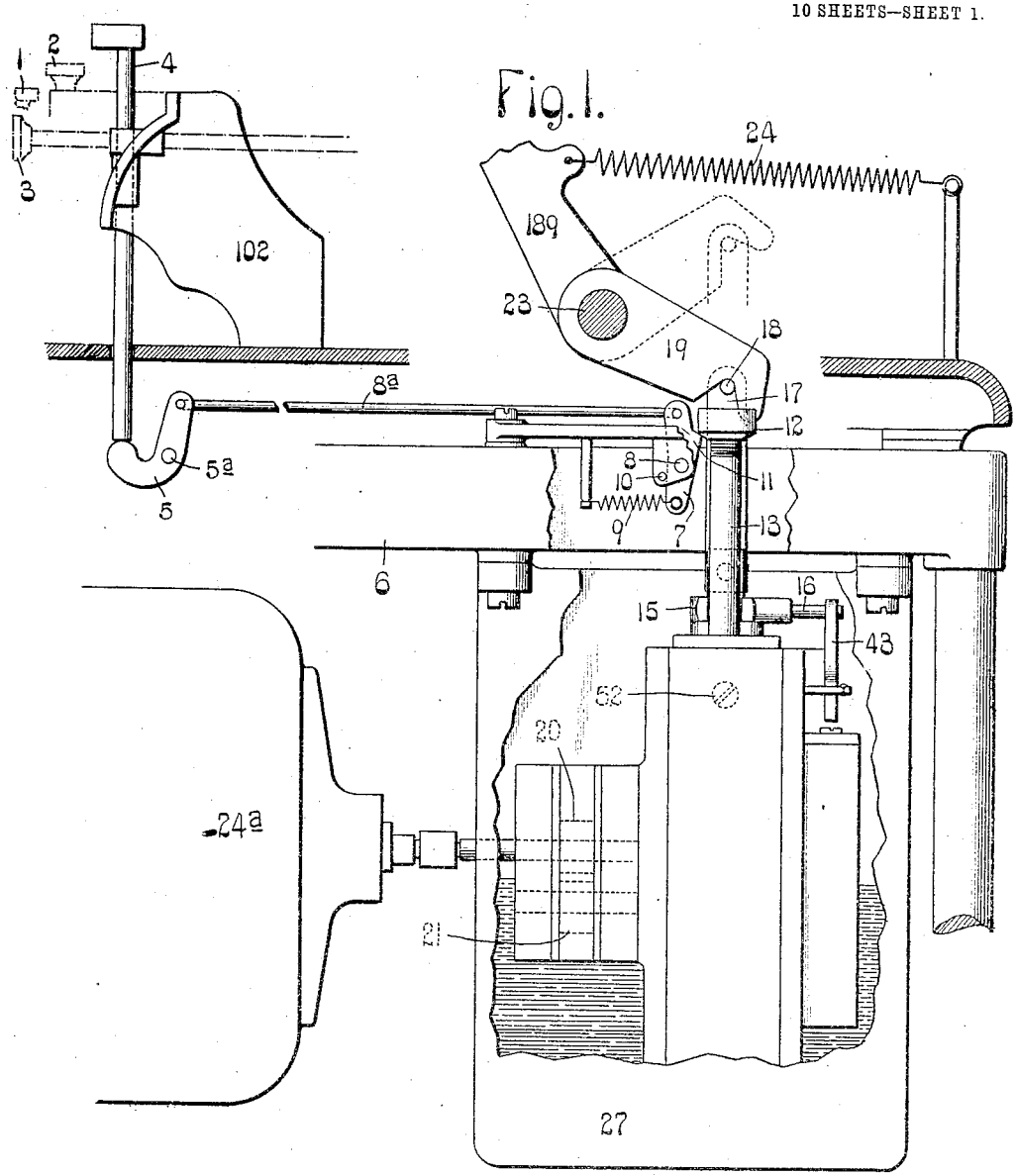

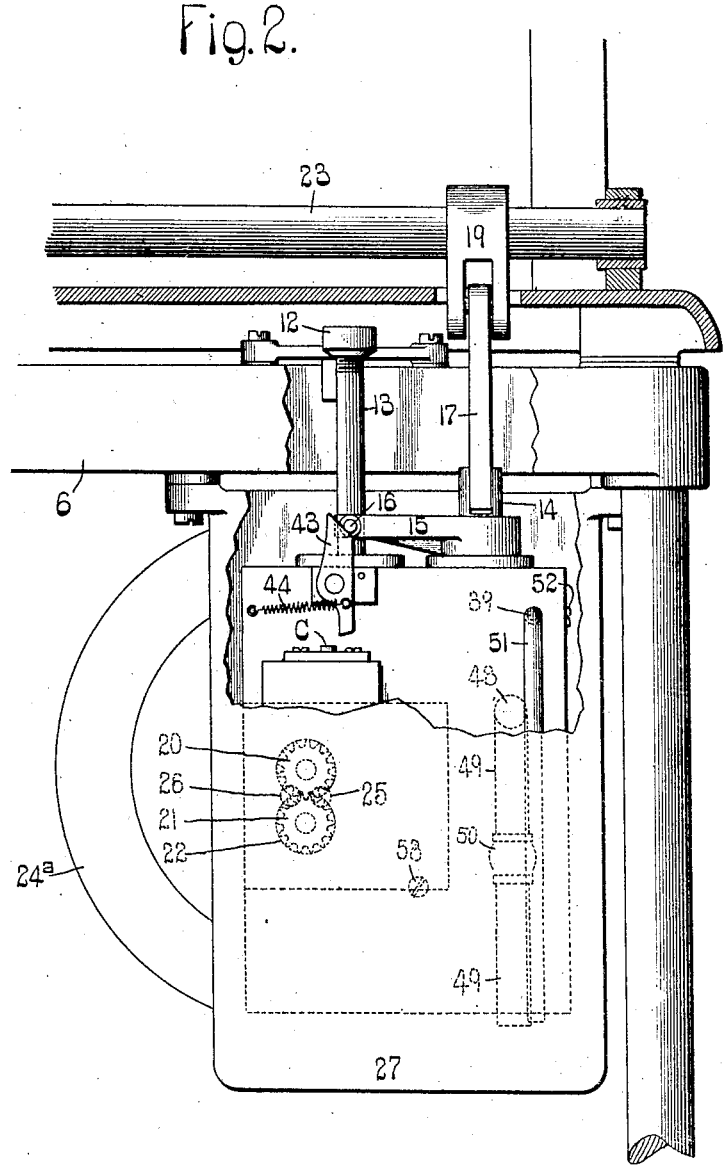

F. M. CARROLL.
MOTOR DRIVE FOR CALCULATING MACHINES.
APPLICATION FILED APR. 20, 1908.
905,146.
Patented Dec. 1, 1908.
10 SHEETS—SHEET 3.
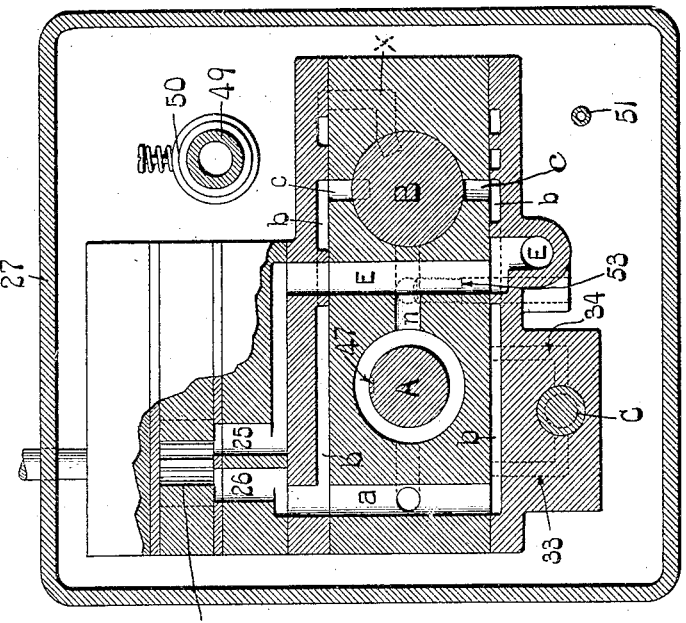
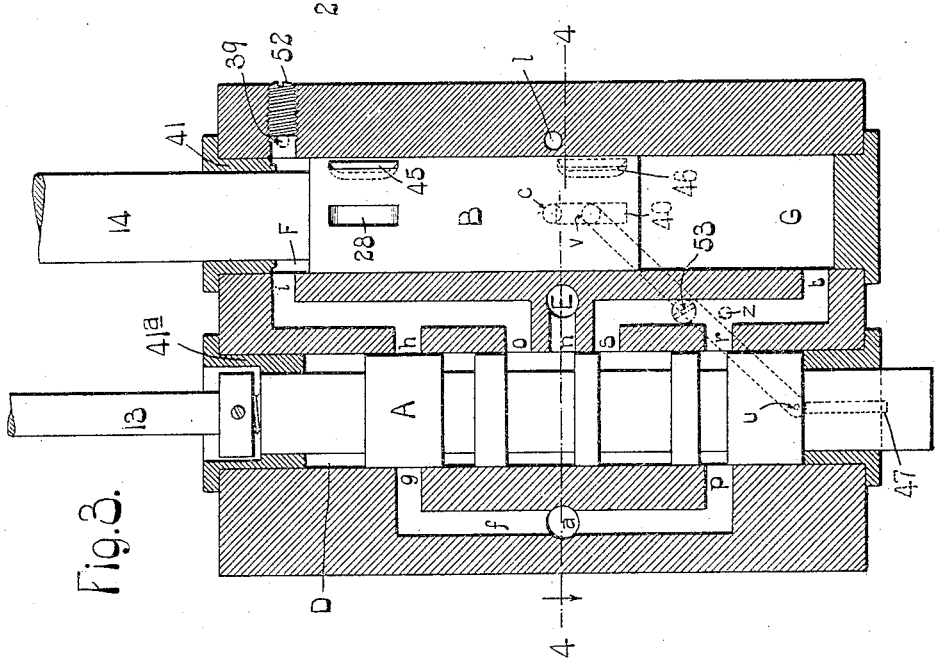
Witnesses
A. J. McCauley
George Ladson
Inventor:
Fred M. Carroll
by Bakewell & Cornwall
Att'ys.

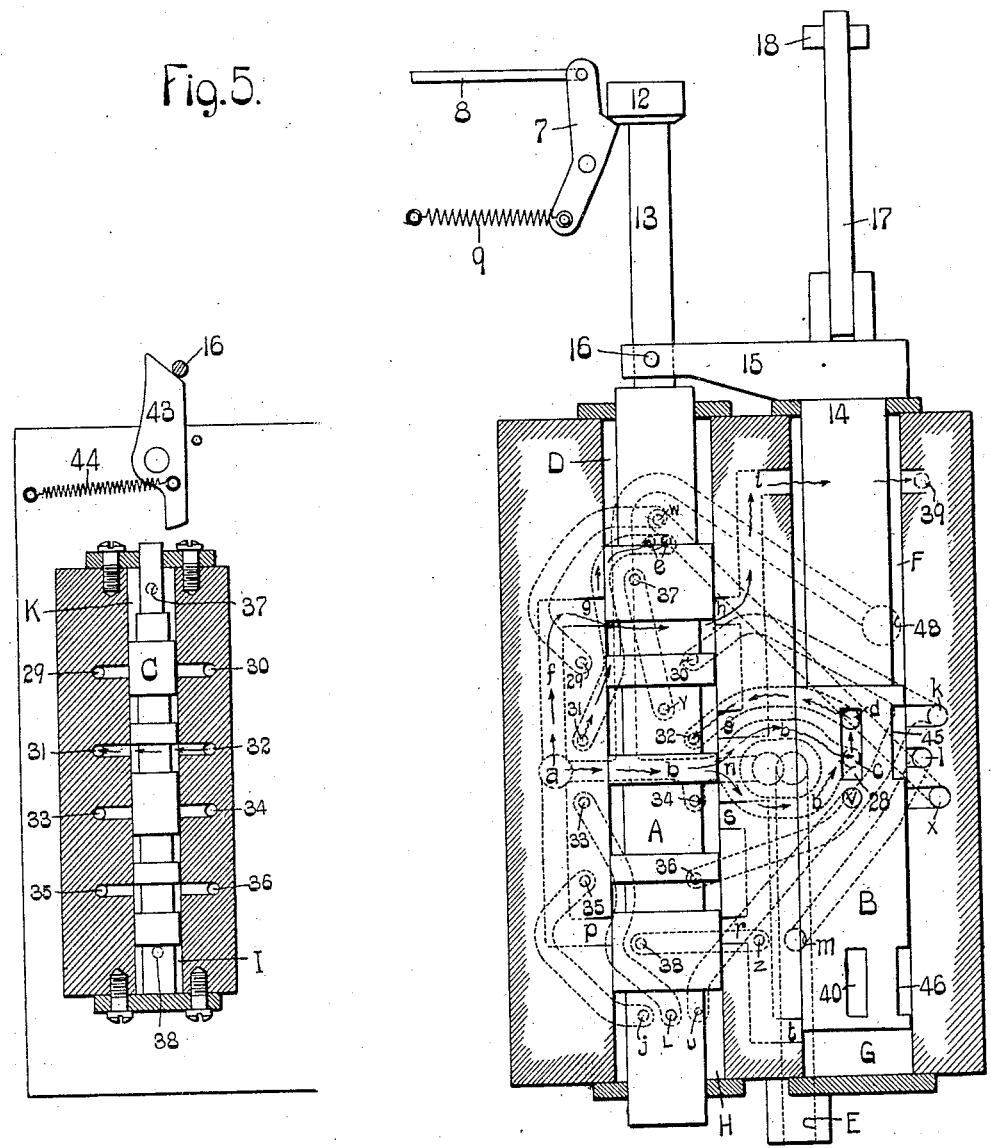

F. M. CARROLL.
MOTOR DRIVE FOR CALCULATING MACHINES.
APPLICATION FILED APR. 20, 1908.

905,146.

Patented Dec. 1, 1908.
10 SHEETS—SHEET 5.

Witnesses
Inventor:
Fred M. Carroll

F. M. CARROLL.
MOTOR DRIVE FOR CALCULATING MACHINES.
APPLICATION FILED APR. 20, 1908.
905,146.
Patented Dec. 1, 1908.
10 SHEETS—SHEET 6.
Fig. 7.
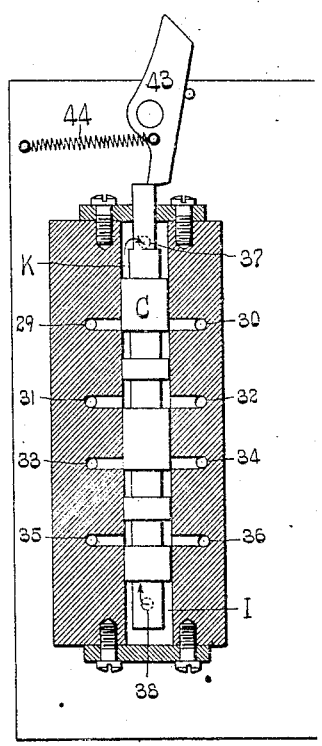
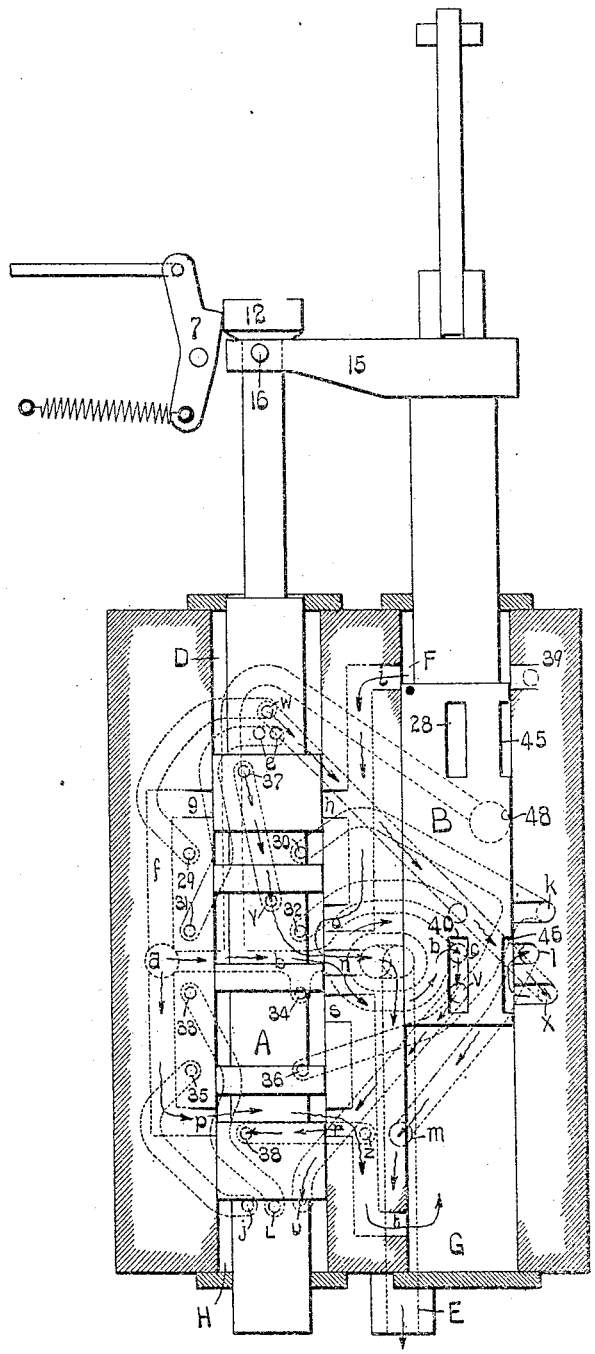
Witnesses
A. J. McCauley
George Ladson
Inventor:
Fred M. Carroll
by Bakewell Cornwall
Attys.

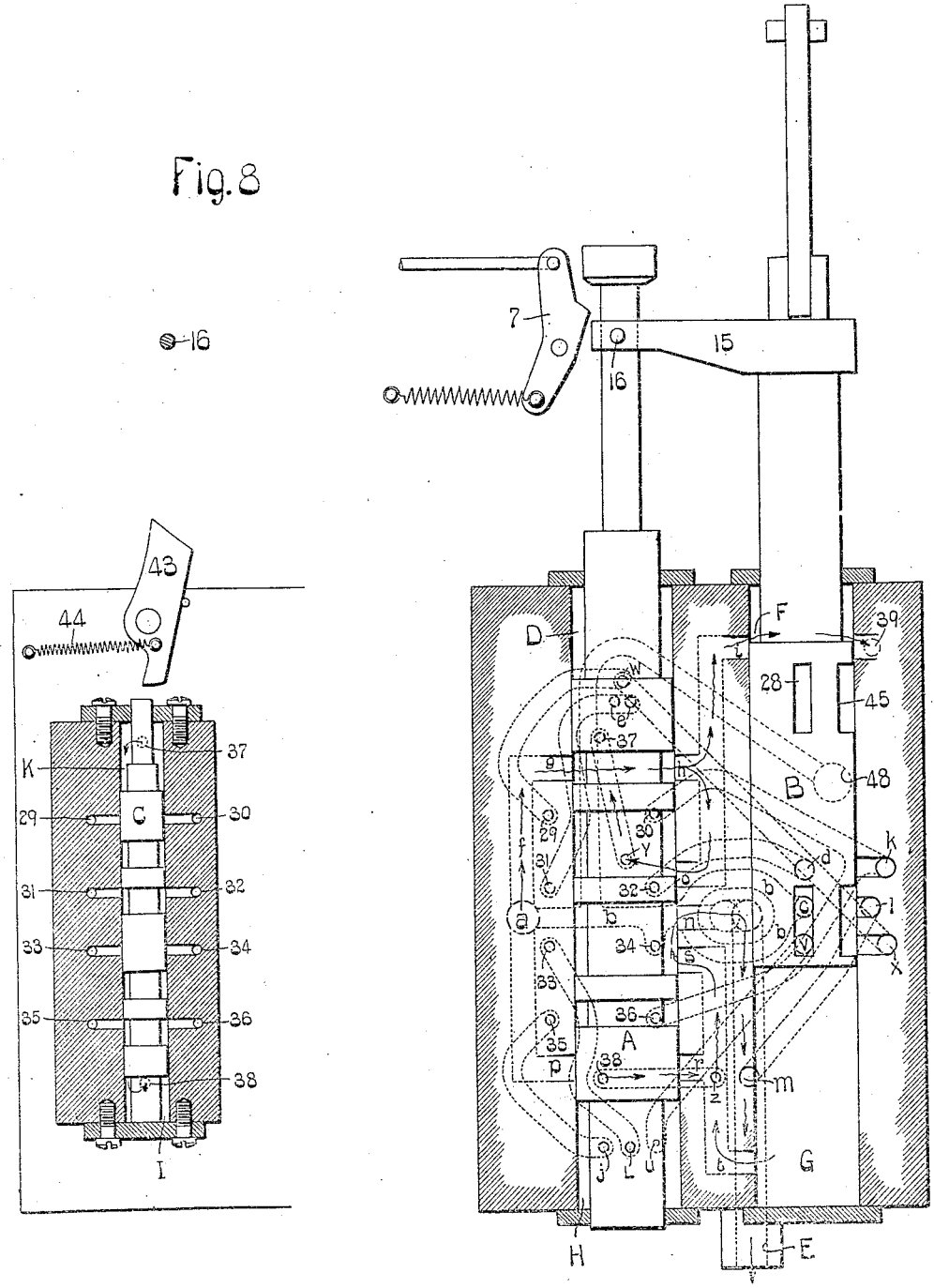

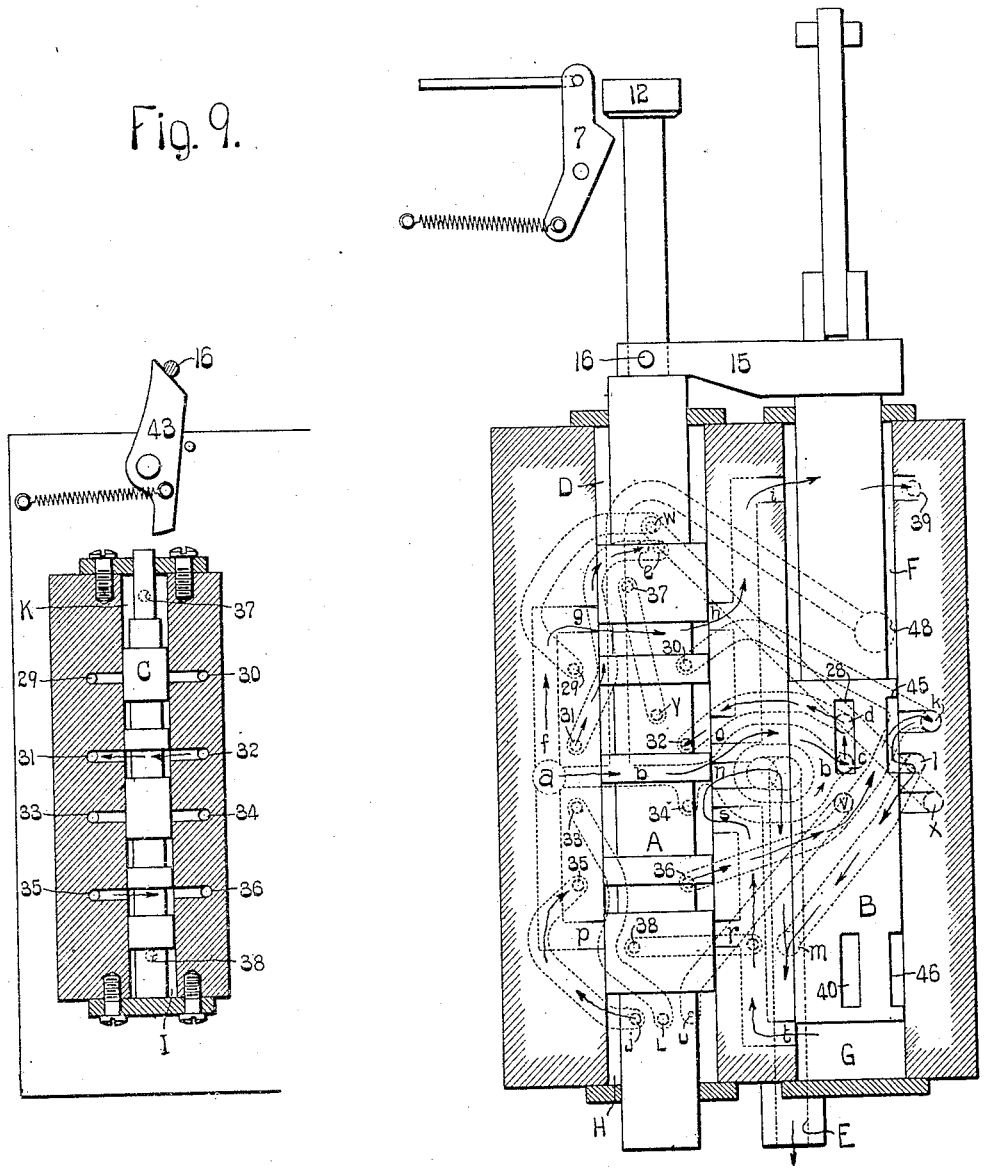

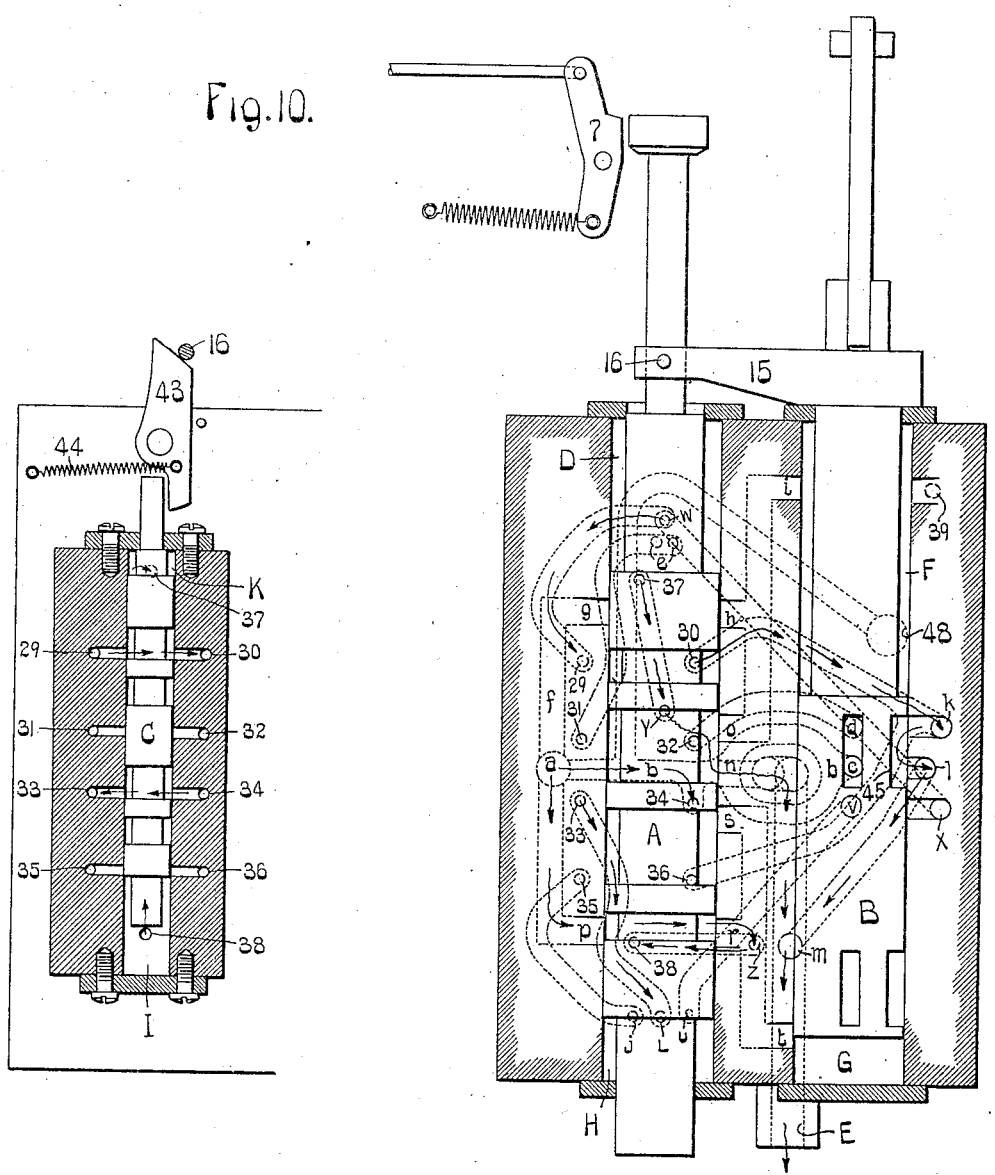

F. M. CARROLL.
MOTOR DRIVE FOR CALCULATING MACHINES.
APPLICATION FILED APR. 20, 1908.
905,146.
Patented Dec. 1, 1908.
10 SHEETS—SHEET 10.
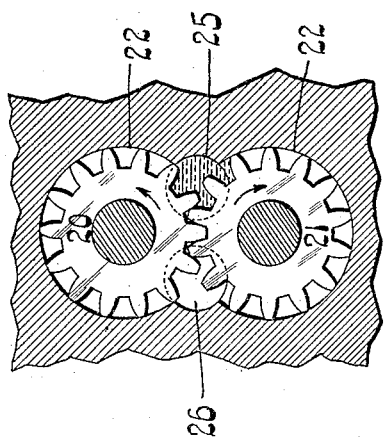
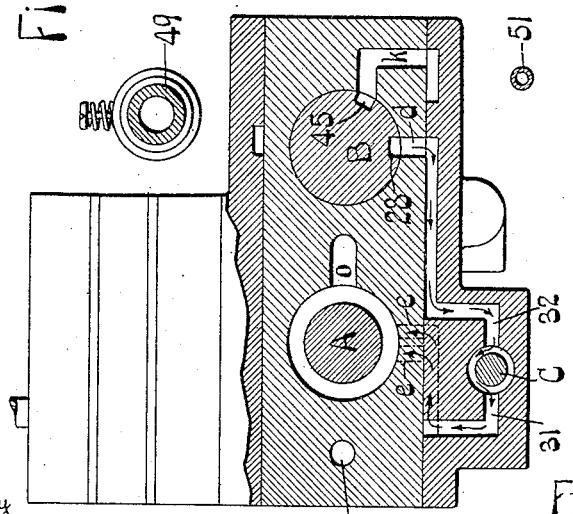
Witnesses
A. J. McCauley
George Ladson
Inventor:
Fred M. Carroll
by Bakewell & Cornwall
Att'ys.

UNITED STATES PATENT OFFICE.

FRED M. CARROLL, OF NEW HAVEN, CONNECTICUT, ASSIGNOR TO CONNECTICUT COMPUTING MACHINE COMPANY, OF NEW HAVEN, CONNECTICUT, A CORPORATION OF CONNECTICUT.

MOTOR-DRIVE FOR CALCULATING-MACHINES.

No. 905,146.　　　Specification of Letters Patent.　　　Patented Dec. 1, 1908.

Application filed April 20, 1908. Serial No. 428,190.

*To all whom it may concern:*

Be it known that I, FRED MERCHANT CARROLL, a citizen of the United States, residing at New Haven, Connecticut, have invented a certain new and useful Improvement in Motor-Drives for Calculating-Machines, of which the following is a full, clear, and exact description, such as will enable others skilled in the art to which it appertains to make and use the same, reference being had to the accompanying drawings, forming part of this specification, in which—

Figure 1 is a side elevational view, partly in section, of a motor drive for computing machines constructed in accordance with my invention; Fig. 2 is a rear elevational view, partly in section; Fig. 3 is a detail vertical sectional view illustrating the valve and piston for actuating the computing machine; Fig. 4 is a horizontal sectional view taken approximately on the line 4—4 of Fig. 3; Figs. 5 to 10 inclusive are diagrammatical views showing the piston and valves in various positions; Fig. 11 is a horizontal sectional view taken through the ports $d$ and 32, the valves being in the position shown in Fig. 5, and the ports $e$ which are located above the aforesaid ports being shown by dot and dash lines; and Fig. 12 is a vertical sectional view illustrating the pump for actuating the valves and piston.

This invention relates to new and useful improvements in motor drives for computing machines.

The accompanying drawings illustrate this device applied to the computing machine shown in Patent No. 789,409, issued to me May 9, 1905, but I wish it to be understood that this invention may be used in connection with various types of computing machines, its use in no way being limited to the particular machine shown in said patent. I have herein shown only a portion of the aforesaid computing machine, and refer to said prior patent for a complete description.

The objects of my present invention are, first, to construct a device of the character described which will, when operated, promptly apply sufficient force to cause the computing machine to make a complete stroke and then stop (a complete stroke being equivalent to the forward and backward movement of the operating handle); second, to cause the computing machine to make a number of strokes when the key, which controls the driving mechanism, is held down; third, to provide means whereby should any part of the computing mechanism be locked at the time the controlling key for the driving mechanism is depressed, said driving mechanism cannot injure or damage the computing mechanism in any way; fourth, to provide means for resetting the driving mechanism whereby it will be in position to operate upon the successive depression of its controlling key, notwithstanding that it had made a preceding idle movement occasioned by the locking of part of the computing mechanism.

To better explain this feature of my invention it might be said that frequently, due to the various locks and counter-locks in the mechanism of a computing machine, which locks are provided to prevent errors in the operation of the machine, an operator will find that when he sets up an example on the key-board of the machine and starts to pull the handle (in a handle-operated machine), the handle is locked against movement due to some maladjustment or malposition of the parts. The error key may then be operated to clear the machine, restoring the parts to normal position, and when the example is again set up in the machine, the handle may be operated because all of the parts are in proper position. This is merely an illustration of the utility of my present invention in connection with the fourth object above set forth. When an example is set up in the machine and the mechanism is locked against movement, the depression of the controlling key for the driving mechanism will only result in part of the driving mechanism making an idle movement without injury to the machine, this idle movement eventually resetting the parts of the driving mechanism in readiness for another operation. The operator can, after such idle movement, operate the error key or do whatever is necessary to unlock the machine, after which, when the control key of the driving mechanism is operated, the driving mechanism is operated and the driving mechanism drives the computing machine in the intended manner.

Briefly stated, the operation of my improved driving mechanism is as follows: A rotary pump or some device for causing the flow of liquid, preferably oil, is driven by a motor, such motor and pump running continuously. In this manner the liquid is forced through various passages and ports and the piston may be constantly operated when proper instrumentalities are actuated to utilize the liquid pressure for this purpose. The piston coöperates with an arm on the operating shaft of the computing machine: The rotary motion of the motor, preferably an electric motor, and of the pump is thus converted into a reciprocatory motion in the piston, which in turn is converted into an arcuate or rocking movement of the operating shaft through such arc as is necessary. There is a fluid actuated valve for controlling the movements of the piston, said fluid actuated valve being primarily under the direct control of the operator, who by pressing an appropriate key or lever may initially release the said valve, which will cause the piston to make its proper stroke, the valve being returned to normal position at the end of said stroke. There is in addition to the fluid actuated valve an auxiliary valve under the control of a tappet, whose position is controlled by the piston. This auxiliary valve works in harmony with the main valve but is prevented from making a full stroke when the piston releases the tappet in its rising movement. Should the piston for any reason be prevented from rising after the release of the main valve, the tappet will be held to one side out of the way of the auxiliary valve, and in this manner the auxiliary valve is permitted to make a full stroke, necessary to insure the return of the main valve to its normal position. It might be said that the main valve in ordinary operations is dependent upon the piston for its return, but under abnormal conditions, when the main valve is released and drops, the piston does not rise, the movement of the auxiliary valve controls the pressures admitted to the main valve, and said main valve is restored to normal position independently of any movement of the piston. In this manner, notwithstanding that parts of the machine may be locked, no possible injury can happen thereto or to the driving mechanism on account of any interference with the movement of the piston. It is of course understood that the fluid pressure under the piston to raise said piston is sufficient to drive the calculating machine, but that when the piston is resisted at the release of the main valve the movement of the auxiliary valve permits the main valve to make its usual stroke and return to normal position, thus relieving the pressure under the piston. The computing machine is, of course, provided with a spring or springs which coöperate with the operating valve to return the same to normal position, but if desired the piston could be so connected to said operating shaft as to return the same to normal position.

While I have shown in the accompanying drawings a chamber in which the liquid is contained, it is obvious that my invention broadly considered contemplates the utilization of fluid and that gases as well as liquids might be used for operating the piston. These gases or liquids either receive their pressures from a circulating medium, in which event their pressures would be variable and dependent upon the power which drives the means for causing such circulation, or said gases or liquids might be stored in a reservoir where they are subjected to constant pressure.

Referring to Fig. 1 of the drawings, 102 is the key frame of the computing machine, said frame being indicated by the same reference character in my prior patent No. 789,409. 1, 2 and 3 indicate keys which constitute a part of the key-board of the computing machine. An operating key 4 which controls the mechanism for actuating the computing machine is slidingly mounted in key frames 102, the lower end of said operating key being in engagement with one end of a bell crank lever 5. Bell crank lever 5 is pivoted at $5^a$ to a table 6 which supports the computing machine. A trigger 7 is pivoted at 8 and connected to the bell crank 5 by means of a rod or bar $8^a$. 9 indicates a spring which tends to keep the trigger 7 against a stop 10, as shown in Fig. 1. When the parts are in this position a tooth 11 on trigger 7 is located under a collar 12 on the end of a valve stem 13, which latter is connected to a valve A. B indicates a piston provided with a stem 14 which carries an arm 15. This arm 15 has a bifurcated end which is adapted to coöperate with valve A and also carries a pin 16 which forms a part of the means for controlling an auxiliary valve C. A pitman 17 is pivoted to the piston stem 14 and provided with a pin 18 at its upper end which is located in a recess in the underside of an arm 19, the latter being secured to the operating shaft 23 of the computing machine. (This shaft 23 is indicated by the same reference character in the patent referred to above.) It will be readily understood that if piston B rises, arm 19 will be moved to the position shown by dotted lines in Fig. 1, and if said piston is then moved downwardly, arm 19 will follow, the energy for the return movement of said arm being derived from a spring 24, which is connected to an arm 189, the latter being secured to shaft 23. If desired, the pin 18 could be located in a hole in arm 19, and in this event the piston B would positively restore the arm to its normal position. 20 and 21 indicate gear wheels which are mounted in a chamber 22 and arranged to form a rotary pump, the gear 20 being connected to the armature shaft of an electric motor $24^a$. An inlet port 25 connects the pump chamber to a passage E, and a discharge port 26 leads from said chamber to a passage b, see Figs. 2 and 4.

By referring to Fig. 12 it will be seen that if liquid is allowed to enter the pump chamber at 25 it will flow into pockets formed by the space between the gear teeth, and if the gears are rotated in the direction indicated by the arrows said liquid will be carried around the periphery of the pump chamber and discharged into the port 26 when the gear teeth come into mesh adjacent said port.

The piston B, valve A and auxiliary valve C are mounted in a housing which is preferably built up of sections, as shown in Fig. 4, and are connected together by means of various passages and ports which will be hereinafter described. This housing is arranged within a liquid-tight case 27, and immersed in a liquid which is pumped through the parts and discharged again into the case. Case 27 forms the support for all the parts contained in it, and both it and the motor are secured to the underside of the computing machine table. The function of valve A is similar to the slide valve of an engine or steam pump, opening and closing the ports and passages as will be described hereinafter. The action of piston B and valve A under normal conditions resembles those of an ordinary steam pump, except that arm 15 does not carry valve A to its resting place, either upon the upward or downward stroke, but carries it to a point where certain ports are open, allowing the pressure of the liquid to finish carrying valve A to its stop at either end. Auxiliary valve C does not have any duty to perform when piston B and valve A are doing their regular work. The functions of auxiliary valve C are to relieve and re-set valve A, if the computing machine should become locked and prevent piston B from rising. As auxiliary valve C is only needed in the emergency described, the mechanism is so adjusted as to cause auxiliary valve C to be ineffective when piston B rises to perform its work.

The valve and piston action will be described as follows, reference being had to Figs. 5 to 10 inclusive, which are diagrammatic views illustrating said parts in various positions:

*Position of rest.*—Referring to Fig. 5, the device occupies what might be termed its normal position, in a state of rest, with piston B completely down, and valve A in a midway position, being under low pressure tending to force it down, but being held up by trigger 7. The passage of fluid when in this position is as follows: Fluid being discharged from the pump into a passes through passage b to port c, thence through slot 28 in piston B to port d, then by passage to port 32, through the chamber of valve C, then out port 31, and by passage to ports e which open into valve chamber D, from whence there is no escape; all outlets being closed so that pressure is set up tending to push the valve A down, and it will do so if trigger 7 is tripped. At the same time fluid is free to pass from a through passage f and enter valve chamber at g, leaving valve chamber at h, thence by passage to i, where it enters piston chamber F, filling this and creating pressure within it tending to hold the piston down to its lowest position. Fluid is discharged from the piston chamber F into the case 27 through an exhaust port 39 which communicates with a pipe 51 leading into the case, as shown in Figs. 2 and 4. The size of port 39 is such that liquid is discharged under low pressure, that is, the cross-sectional area 39 is such that it will not discharge the output of pump without maintaining a pressure of say ten pounds per square inch in the piston and valve chambers.

*Starting.*—Referring to Fig. 6, it will be seen that trigger 7 has been tripped by means of the starting key on the keyboard. This tripping leaves the valve A free to move downwardly under low pressure. During the downward travel of valve A the first thing that occurs is the closing of port g, preventing the passage of fluid from g to h, and thus the escape from low pressure exhaust 39, so the leakage mentioned above is stopped and the pressure immediately rises to say one hundred pounds per square inch. Valve A continues down under this high pressure, being permitted to do so because exhaust passages j to 35 to 36, 36 to k, through slot 45 in piston to l to m, and m to discharge E are open. When the valve A is down as shown, an exhaust port at n is open and fluid is free to pass from the upper part of piston chamber F through i to o, then in the direction of the arrow n, thence out discharge E, which is done when the piston rises. At p a port is open that will permit fluid to pass from a to p to r, (it cannot escape at s) to t, and under the piston into chamber G, and this will cause the piston to rise and fluid will continue to be supplied, the device being so adjusted that a desired stroke for the piston will be obtained.

*Actuating machine.*—The movement of the parts during the time represented between the positions in Figs. 6 and 7 is as follows: Piston is moved up under high pressure until it reaches a certain point, which we will assume is about one-eighth inch from the end of its stroke, where, by means of an arm 15 on the piston B and collar 12 on valve A, the piston B takes hold of valve A and carries A up with B for about one-sixteenth of an inch to the position shown in Fig. 7. At this time the port u has just opened into the chamber H, and slot 40 in the piston B is so positioned that ports c and v will be connected, thus allowing fluid to pass from a through passage b to c and v and to u, thence into chamber H, under valve A, causing it to rise at about the same speed as piston B, the exhaust passing from w to X through slot 46 in the piston to l, l to m and thence out through discharge E, so that both will continue up until the piston B comes to its stop (still under pressure), and then valve A will still continue moving up until it comes to stop against the sleeve 41ª shown in Fig. 3, the upward movement of the piston B being limited by a sleeve 41 shown in Fig. 3.

*Auxiliary valve ineffective.*—In Fig. 7 it will be seen that the auxiliary valve C has risen. This is due to the pressure under piston B being transmitted through the passage Z to 38, and thence into auxiliary valve chamber I, under valve C, causing it to rise. As shown in Fig. 5, the pin 16 is so engaged with an inclined face on the upper end of dog 43 that if auxiliary valve C were to rise nothing would prevent its upward movement, but as shown in Fig. 7, when the piston B rose, pin 16 went with it, allowing the spring 44 to act on the dog 43, which took the position shown, and formed a stop for the auxiliary valve C, allowing it to move only partially up. It must be noted that this partial movement of valve C does not affect the passages in any way, that is, the passages opened or closed by the auxiliary valve C are exactly the same in Fig. 5 as in Fig. 7. The speed of the upward movement of the auxiliary valve C is regulated in relation to the speed of piston B by the size of the openings 37 and 38, the design preferably being to have the piston B rise faster than valve C, so that there will be no question about the pin 16 moving away before the valve C could pass the lower end of the dog 43.

*Starting downward.*—Fig. 8 shows both valve A and piston B in their extreme upward positions. When valve A is in this position the passage is open at g, permitting fluid from a to pass through f to g to h to i and into chamber F, tending to force the piston B down. This is the next thing that occurs as exhaust is open from t to S, in the direction of the arrows, thence to discharge E, so piston B is free to move down, which it does, although under low pressure, because the same leakage occurs at 39 as shown in Fig. 5. The fluid also passes from a through f to g to h to o to y to 37 into chamber K above the valve C, which forces valve C down as shown, the exhaust passing from 38 to Z to S in the direction of the arrows, and thence to discharge E.

*Return to rest.*—Fig. 9 shows the piston B on its downward stroke in a position about one-sixteenth of an inch from the extreme end of the stroke, after it has carried the valve A down far enough so that ports e are open, permitting fluid from a to pass through b to c to d to 32 to 31 to e, thence into chamber D and continue the downward movement of valve A (after piston B has come to its stop) until collar 12, on valve A, stops on the trigger 7, then we would have conditions exactly the same as in Fig. 5 with all the parts at rest. If the trigger were again tripped we would have a repetition of the foregoing action.

*Repeating.*—If trigger 7 were held out of engagement with the collar 12 on valve A, this action would be repeated over and over again, that is, valve A in coming down as in Fig. 9 could not stop on the trigger, but would continue on down as in Fig. 6, giving a constant reciprocating motion to piston B, once, twice, or as often as desired.

*Emergency action.*—When the trigger 7 is tripped and valve A descends, as in Fig. 6, if the mechanism of the computing machine is locked an excessive load is placed on piston B and it is prevented from rising as it does in Fig. 7, and in this event valve A will be re-set on the trigger in the following manner: Of course, if piston B cannot rise neither can the pin 16, so the dog remains out of the path of auxiliary valve C; then when auxiliary valve C comes up as in Fig. 7, instead of stopping against the dog 43 it continues on up to the position shown in Fig. 10, and in doing so closes one set of passages, which communicate with the auxiliary valve chamber and opens another, and then instead of the pressure holding valve A down, as in Fig. 6, the pressure forces it up as in Fig. 10, that is, the liquid flows from a to b to 34, through auxiliary valve chamber to 33 (this being closed in Figs. 5 to 9), then by the passage to L and into chamber H, giving a pressure tending to lift the valve A, being permitted to do so by exhausting through W to 29, and 29 to 30 (29 to 30 being closed in Figs. 5 to 9), 30 to k and k to l to m and thence to discharge E. By this method valve A is raised to the position shown in Fig. 9, where pressure holding up the auxiliary valve C is shut off at p and r, and pressure to force it down is opened at q to h, to o to y to 37 to K, then auxiliary valve C is forced down to the same position as shown in Fig. 5, and the action of fluid is again the same as is Fig. 5. This will be repeated as long as the piston B is prevented from rising, and the operating key is depressed.

In Fig. 3 the valve A is shown in its lowermost position, and the piston B is shown on the way up, at a point where ports c and v are just being connected, by slot 40, in piston B, allowing fluid to pass from a through b to c to v, to u, where it has no outlet except by leakage. If this leakage should occur fluid would escape into the chamber under valve A, and cause a premature rise of valve, which would reverse the direction of the piston B before it had reached its upper stop. To avoid this reversal a channel 47 is cut in valve A, as shown in Figs. 3 and 4, and any leakage at $u$ is conveyed (by means of this channel) into the case 27. This channel is so arranged that when the ports occupy the positions shown in Fig. 7 the channel has just been closed, allowing no further escape from valve chamber. When valve A is lifted from its lowermost position by fluid pressure, the supply of fluid is so great and the pressure so high that leakage through the channel in valve A is not noticeable.

The port 48, as shown in the diagrammatical views, communicates with passage $b$ and leads to a pipe 49 (see Figs. 2 and 4), which is provided with an adjustable relief valve 50. The function of this relief valve is to allow the pump to force the liquid directly into the case 27 when, through any cause whatever, pressure tends to rise above normal, thus avoiding injury to any of the mechanism. The port 39 communicates with a pipe 51 which forms a conduit leading into the case 27. 52 indicates an adjusting screw (see Figs. 2 and 3) for the purpose of varying the size of the low pressure outlet 39. This adjusting screw enables the low pressure described in referring to Fig. 5 to be regulated to whatever is desired. An adjusting screw 53 (see Figs. 2, 3 and 4) is adapted to choke off the passage leading from $t$ to $s$, and is for the purpose of regulating the speed of piston B on its downward stroke.

In order to manufacture this device economically it will be necessary to form openings which must be closed later on. The method of stopping off these openings is preferably by means of threaded plugs which, to avoid confusion, are not shown in the drawings.

Having thus described the invention, what is claimed as new and desired to be secured by Letters Patent is:

1. In a computing machine, the combination with a key-board, an operating shaft, a fluid-actuated piston for operating said shaft, a fluid-actuated valve for controlling said piston, and a key arranged in said key-board for rendering the fluid-actuated valve operative; substantially as described.

2. In a computing machine, the combination with a key-board, an operating shaft, a fluid-actuated piston for operating said shaft, a fluid-actuated valve for controlling said piston, a key arranged in said key-board, and means under control of said key and coöperating with said fluid-actuated valve for holding the same in an inoperative position; substantially as described.

3. In a computing machine, the combination with the key-board and operating shaft, springs for returning said operating shaft to normal position, a fluid-actuated piston for operating said shaft against the action of said springs, a fluid-actuated valve for controlling said piston, and a key arranged in said key-board for controlling said fluid-actuated valve; substantially as described.

4. The combination with a computing machine, its key-board and its operating shaft, of a liquid chamber in ported communication with the piston chamber, a fluid-actuated piston for driving said operating shaft, means for causing circulation of liquid through said chambers, a fluid-actuated valve for controlling the passage of said liquid through the ported communications, and means convenient to the operator for initially releasing said fluid-actuated valve; substantially as described.

5. The combination with a computing machine, its key-board and its operating shaft, of a casing containing a liquid chamber in ported communication with a piston chamber, a pump for causing the circulation of liquid through said ports, means for driving said pump, a piston in said piston chamber connected to said operating shaft, a fluid-actuated valve for controlling said piston, and means under the control of the operator for initially releasing said fluid-actuated valve; substantially as described.

6. The combination with a computing machine, its key-board and its operating shaft, of a fluid-actuated piston for controlling said actuating shaft, a valve for controlling the movement of said piston, means under the control of the operator for releasing said valve and rendering said piston effective, and means under control of said piston for preventing movement thereof when said piston encounters abnormal resistance; substantially as described.

7. The combination with a computing machine, its key-board and its operating shaft, of a fluid-actuated piston for driving said operating shaft, a valve for controlling the movement of said piston, means under control of the operator for rendering said valve and its controlled piston operative, and means controlled by said piston for rendering said piston inoperative and at the same time insuring full movement of its controlling valve when said piston encounters abnormal resistance; substantially as described.

8. The combination with a computing machine, its keyboard and its operating shaft, of a fluid-actuated piston for controlling said shaft, a valve for controlling the movement of said piston, means under control of the operator for rendering said valve and its controlled piston operative, and an auxiliary valve under control of said piston whereby when said operating valve or parts driven thereby are locked and the piston is prevented from moving, said auxiliary valve is permitted to move so as to insure a full movement of the main valve and the restoration of said main valve and said auxiliary valve to normal position; substantially as described.

9. The combination with a computing machine, its keyboard and its operating shaft, of means for placing fluid under pressure, mechanism actuated by fluid pressure, said mechanism being adapted to rock said operating shaft, and means for rendering said mechanism inoperative when the operating shaft is overloaded; substantially as described.

10. The combination with a computing machine, its keyboard and its operating shaft, of means for placing fluid under pressure, mechanism actuated by fluid pressure, said mechanism being adapted to rock said operating shaft, and means operated by fluid pressure for rendering said mechanism inoperative when the operating shaft is overloaded; substantially as described.

11. The combination with a computing machine, its keyboard and its operating shaft, of means for placing fluid under pressure, mechanism actuated by fluid pressure, said mechanism being adapted to rock said operating shaft, and means including a valve operated by fluid pressure for rendering said mechanism inoperative when the operating shaft is overloaded; substantially as described.

12. The combination with a computing machine, its keyboard and its operating shaft, of means for placing fluid under pressure, mechanism actuated by fluid pressure, said mechanism being adapted to positively rock said operating shaft in one direction and leave it free to be returned by independent means; substantially as described.

13. The combination with a computing machine, its keyboard and its operating shaft and a re-setting spring therefor, of means for placing fluid under pressure, mechanism actuated by fluid pressure, said mechanism being adapted to positively rock said operating shaft in one direction and leave it free to be returned by the re-setting spring; substantially as described.

14. The combination with a computing machine, its keyboard and its operating shaft, of means for placing fluid under pressure, mechanism actuated by fluid pressure, said mechanism being under control of the operator and adapted to rock said operating shaft, and means for rendering said mechanism inoperative when the operating shaft is overloaded; substantially as described.

15. The combination with a computing machine, its keyboard and its operating shaft, of means for placing fluid under pressure, mechanism actuated by fluid pressure, said mechanism being controlled by an operating key and adapted to rock said operating shaft, and means for rendering said mechanism inoperative when the operating shaft is overloaded; substantially as described.

16. The combination with a computing machine, its keyboard and its operating shaft, of means for placing fluid under pressure, mechanism actuated by fluid pressure, said mechanism being under control of the operator and adapted to positively rock said operating shaft in one direction and leave it free to be returned by independent means; substantially as described.

17. The combination with a computing machine, its keyboard and its operating shaft, of means for placing fluid under pressure, mechanism actuated by fluid pressure, said mechanism being controlled by an operating key adapted to positively rock said operating shaft in one direction and leave it free to be returned by independent means; substantially as described.

18. The combination with a computing machine, its keyboard and its operating shaft, of means for placing fluid under pressure, mechanism including a piston actuated by fluid pressure, said mechanism being adapted to rock said operating shaft, and means for rendering said mechanism inoperative when the operating shaft is overloaded; substantially as described.

19. The combination with a computing machine, its keyboard and its operating shaft, of means for placing fluid under pressure, mechanism including a piston actuated by fluid pressure, said mechanism being adapted to positively rock said operating shaft in one direction and leave it free to be returned by independent means; substantially as described.

20. The combination with a computing machine, its keyboard and its operating shaft, of constantly operating means for placing fluid under pressure, mechanism actuated by fluid pressure, said mechanism being adapted to rock said operating shaft, and means for rendering said mechanism inoperative when the operating shaft is overloaded; substantially as described.

21. The combination with a computing machine, its keyboard and its operating shaft, of constantly operating means for placing fluid under pressure, mechanism actuated by fluid pressure, said mechanism being adapted to positively rock said operating shaft in one direction and leave it free to be returned by independent means; substantially as described.

22. The combination with a computing machine, its keyboard and its operating shaft, of constantly operating means for placing fluid under pressure, mechanism actuated by fluid pressure, said mechanism being under control of the operator and adapted to rock said operating shaft, and means for rendering said mechanism inoperative when the operating shaft is overloaded; substantially as described.

23. The combination with a computing machine, its keyboard and its operating shaft, of constantly operating means for placing fluid under pressure, mechanism actuated by fluid pressure, said mechanism being under control of the operator and adapted to positively rock said operating shaft in one direction and leave it free to be returned by independent means; substantially as described.

24. The combination with a computing machine, its keyboard and its operating shaft, of constantly driven means for placing fluid under pressure, mechanism actuated by fluid pressure, said mechanism being controlled by an operating key adapted to positively rock said operating shaft in one direction and leave it free to be returned by independent means; substantially as described.

25. The combination with an operating shaft, of a constantly operating means for placing fluid under pressure, and intermittently operating mechanism actuated by fluid pressure, said mechanism being adapted to rock said operating shaft; substantially as described.

26. The combination with an operating rock shaft, of a constantly driven means for placing fluid under pressure, and intermittently operating mechanism actuated by fluid pressure, said mechanism being adapted to rock said operating shaft; substantially as described.

27. The combination with an operating rock shaft, of a constantly operating means for placing fluid under pressure, and intermittently operating mechanism actuated by fluid pressure, said mechanism including a piston and being adapted to rock said operating shaft; substantially as described.

28. The combination with an operating rock shaft, of a constantly operating means for placing fluid under pressure, and intermittently operating mechanism actuated by fluid pressure, said mechanism being under control of the operator and adapted to rock said operating shaft; substantially as described.

29. The combination with an operating rock shaft, of a constantly operating means for placing fluid under pressure, and intermittently operating mechanism actuated by fluid pressure, said mechanism being controlled by an operating key and adapted to rock said operating shaft; substantially as described.

30. The combination with an operating rock shaft, of a constantly operating means for placing fluid under pressure, intermittently operating mechanism actuated by fluid pressure, said mechanism being adapted to rock said operating shaft, and means for rendering said means inoperative when the operating shaft is overloaded; substantially as described.

31. The combination with an operating rock shaft, of a constantly operating pump for placing fluid under pressure, and intermittently operating mechanism actuated by fluid pressure, said mechanism being adapted to rock said operating shaft; substantially as described.

32. The combination with an operating shaft, of means for placing fluid under pressure, and intermittently operating mechanism actuated by fluid pressure, said mechanism being adapted to rock said operating shaft; substantially as described.

33. The combination with an operating rock shaft, of a pump for placing fluid under pressure, and intermittently operating mechanism actuated by fluid pressure, said mechanism being adapted to rock said operating shaft; substantially as described.

34. The combination with an operating shaft, of means for placing fluid under pressure, and intermittently operating mechanism actuated by fluid pressure, said mechanism being under control of the operator and adapted to rock said operating shaft; substantially as described.

35. The combination with an operating shaft, of a constantly operating means for placing fluid under pressure, and intermittently operating mechanism actuated by fluid pressure, said mechanism being adapted to rock said operating shaft in one direction and then leave it free to be returned to normal position by independent means; substantially as described.

36. The combination with an operating rock shaft, of a constantly operating means for placing fluid under pressure, and intermittently operating mechanism actuated by fluid pressure, said mechanism including a valve-controlled piston and being adapted to rock said operating shaft; substantially as described.

37. The combination with an operating rock shaft, of a constantly operating means for placing fluid under pressure, and intermittently operating mechanism actuated by fluid pressure, said mechanism including a valve controlled by an operating key and being adapted to rock said operating shaft; substantially as described.

38. The combination with an operating rock shaft, of means for placing fluid under pressure, and intermittently operating mechanism actuated by fluid pressure, said mechanism including a valve controlled by an operating key and being adapted to rock said operating shaft; substantially as described.

39. The combination with an operating rock shaft, of means for placing fluid under pressure, and intermittently operating mechanism actuated by fluid pressure, said mechanism being controlled by the operator and adapted to rock said operating shaft; substantially as described.

40. The combination with an operating rock shaft, of means for placing fluid under pressure, a piston operated by said means, connections between the piston and the operating shaft, a valve for controlling said piston, said valve being controlled by an operating key, and means for rendering said piston inoperative when the operating rock shaft is overloaded; substantially as described.

41. The combination with an operating rock shaft, of means for placing fluid under pressure, a piston operated by said means, connections between the piston and the operating shaft, a valve for controlling said piston, said valve being controlled by the operator, and means for rendering said piston inoperative when the operating rock shaft is overloaded; substantially as described.

42. The combination with an operating rock shaft, of means for placing fluid under pressure, a piston operated by said means, connections between the piston and the operating shaft, a movable valve for controlling said piston, said valve being controlled by an operating key, and means for rendering said piston inoperative and restoring the valve to its normal position when the operating rock shaft is overloaded; substantially as described.

43. The combination with an operating shaft, of a constantly operating means for placing fluid under pressure, and intermittently operating mechanism actuated by fluid pressure, said mechanism being adapted to actuate said operating shaft; substantially as described.

44. The combination with an operating shaft, of means for placing fluid under pressure, and intermittently operating mechanism actuated by fluid pressure, said mechanism being adapted to actuate said operating shaft; substantially as described.

45. The combination with an operating shaft, of means for placing fluid under pressure, fluid-controlled mechanism for actuating said operating shaft, said mechanism being under control of the operator, and means for rendering said mechanism inoperative when the operating shaft is overloaded; substantially as described.

46. The combination with an operating shaft, of means for placing fluid under pressure, fluid-controlled mechanism for actuating said operating shaft, said mechanism being under control of the operator, and means for rendering said means inoperative and restoring it to its normal position when the operating shaft is overloaded; substantially as described.

47. The combination with an operating shaft, of means for placing fluid under pressure, a fluid-controlled piston for actuating said operating shaft, and means whereby said piston is moved in one direction under high pressure and in the opposite direction under low pressure; substantially as described.

48. The combination with an operating shaft, of means for placing fluid under pressure, a fluid-controlled piston for actuating said operating shaft, and means whereby said piston is moved in one direction under comparatively high pressure; substantially as described.

49. The combination with an operating shaft, of means for placing fluid under pressure, a fluid-controlled piston for actuating said operating shaft, and means for adjusting the speed of said piston; substantially as described.

50. The combination with an operating shaft, of means for placing fluid under pressure, a fluid-controlled piston for actuating said operating shaft, a valve for controlling said piston, said valve being under control of the operator, and means for adjusting the speed of said piston; substantially as described.

51. The combination with an operating shaft, of means for placing fluid under pressure, a fluid-controlled piston for actuating said operating shaft, and valves for controlling said piston, one of said valves being normally ineffective; substantially as described.

52. The combination with an operating shaft, of means for placing fluid under pressure, a fluid-controlled piston for actuating said operating shaft, and valves for controlling said piston, one of said valves being effective only when the operating shaft is overloaded; substantially as described.

53. The combination with an operating shaft, of means for placing fluid under pressure, a fluid-controlled piston for actuating said operating shaft, a valve for controlling said piston, said valve and piston being constantly under pressure, and an operating key for controlling said valve; substantially as described.

54. The combination with an operating shaft, of means for placing fluid under pressure, a fluid-controlled piston for actuating said operating shaft, a valve for controlling said piston, said valve and piston being constantly under pressure but normally stationary, and an operating key for controlling said valve, substantially as described.

55. The combination with an operating shaft, of means for placing fluid under pressure, a fluid-controlled piston for actuating said operating shaft, a valve for controlling said piston, said valve being constantly under pressure, and a movable stop for normally holding said valve stationary, said stop being under control of the operator; substantially as described.

56. The combination with an operating shaft, of means for placing fluid under pressure, a fluid-controlled piston for actuating said operating shaft, a valve for controlling said piston, said valve being constantly under pressure, and a movable stop for normally holding said valve stationary, and an operating key for releasing said stop; substantially as described.

57. The combination with an operating shaft, of means for placing fluid under pressure, mechanism actuated by fluid pressure coöperating with said means, said mechanism being capable of actuating said operating shaft, and means for causing said mechanism to actuate said operating shaft once and then stop; substantially as described.

58. The combination with an operating shaft, of means for placing fluid under pressure, mechanism actuated by fluid pressure coöperating with said means, said mechanism being capable of actuating said operating shaft, and means for causing said mechanism to actuate said operating shaft once and then stop, the last-mentioned means being under control of the operator; substantially as described.

59. The combination with an operating shaft, of means for placing fluid under pressure, mechanism actuated by fluid pressure coöperating with said means, said mechanism being capable of actuating said operating shaft, and means for causing said mechanism to actuate said operating shaft a predetermined number of times; substantially as described.

60. The combination of an operating shaft, of means for placing fluid under pressure, mechanism actuated by fluid pressure coöperating with said means, said mechanism being capable of actuating said operating shaft, and means for causing said mechanism to actuate said operating shaft a predetermined number of times, the last-mentioned means being under control of the operator; substantially as described.

61. The combination with an operating shaft, of means for placing fluid under pressure, mechanism actuated by fluid pressure coöperating with said means, said mechanism being capable of actuating said operating shaft, and means for causing said mechanism to actuate said operating shaft under comparatively high pressure and return to normal position under comparatively low pressure; substantially as described.

62. In a device of the character described, the combination with a key-board including an operating key, of an operating shaft, means for placing fluid under pressure, fluid-controlled mechanism coöperating with said means, said mechanism being capable of actuating said operating shaft and being controlled by said operating key; substantially as described.

63. In a device of the character described, the combination with a key-board including an operating key, of an operating shaft, constantly operating means for placing fluid under pressure, fluid-controlled mechanism coöperating with said means, said mechanism being capable of actuating said operating shaft, and being controlled by said operating key; substantially as described.

64. In a device of the character described, the combination with a key-board including an operating key, of an operating shaft, means for placing fluid under pressure, fluid-controlled mechanism coöperating with said means, said mechanism being capable of actuating said operating shaft and being controlled by said operating key, and means for rendering said mechanism inoperative when the operating shaft is overloaded; substantially as described.

65. In a device of the character described, the combination with a key-board including an operating key, of an operating shaft, means for placing fluid under pressure, fluid-controlled mechanism coöperating with said means, said mechanism being capable of actuating said operating shaft and being controlled by said operating key, and means whereby said mechanism is automatically rendered ineffective when the operating shaft is overloaded; substantially as described.

66. In a device of the character described, the combination with a key-board including an operating key, of an operating shaft, means for placing fluid under pressure, fluid-controlled mechanism coöperating with said means, said mechanism including a valve-controlled piston for actuating said operating shaft and being controlled by said operating key; substantially as described.

67. In a device of the character described, the combination with a key-board including an operating key, of an operating shaft, means for placing fluid under pressure, a constantly running motor for driving said means, fluid-controlled mechanism coöperating with said means, said mechanism being capable of actuating said operating shaft and being controlled by said operating key; substantially as described.

68. In a device of the character described, the combination with a key-board including an operating key, of an operating shaft, means for placing fluid under pressure, fluid-controlled mechanism coöperating with said means, said mechanism being capable of actuating said operating shaft when the operating key is moved to its abnormal position; substantially as described.

69. In a device of the character described, the combination with a key-board including an operating key, of an operating shaft, means for placing fluid under pressure, fluid-controlled mechanism coöperating with said means, said mechanism being capable of actuating said operating shaft a predetermined number of times and being under control of the operating key; substantially as described.

70. In a device of the character described, the combination with a key-board including an operating key, of an operating shaft, means for placing fluid under pressure, fluid-controlled mechanism coöperating with said means, said mechanism being capable of actuating said operating shaft continuously when the operating key is held in its abnormal position; substantially as described.

In testimony whereof I hereunto affix my signature in the presence of two witnesses, this fourteenth day of April 1908.

FRED M. CARROLL.

Witnesses:
M. E. BEIMLER,
L. C. STILLMAN.